United States Patent [19]
Garrett

[11] 3,752,292
[45] Aug. 14, 1973

[54] METHOD AND APPARATUS FOR CONVEYING CONTAINERS

[76] Inventor: Burton R. Garrett, 836 Logan St., Brooklyn, N.Y. 11208

[22] Filed: Sept. 20, 1971

[21] Appl. No.: 181,815

[52] U.S. Cl. .............................. 198/25, 198/33 AD
[51] Int. Cl. ................................................ B65g 47/00
[58] Field of Search ............ 198/25, 33 AA, 33 AC, 198/33 AD

[56] References Cited
UNITED STATES PATENTS
| | | | |
|---|---|---|---|
| 1,325,527 | 12/1919 | Mingle | 198/33 AC |
| 2,109,391 | 2/1938 | Lauck | 198/33 AA |
| 1,263,485 | 4/1918 | Thornburg | 198/33 AA |
| 2,003,668 | 6/1935 | Pittenger | 198/33 AA |
| 3,348,654 | 10/1967 | Garrett | 198/33 AD |
| 3,305,065 | 2/1967 | Babunovic et al. | 198/25 |

*Primary Examiner*—Richard E. Aegerter
*Assistant Examiner*—H. S. Lane
*Attorney*—Jordan B. Bierman et al.

[57] ABSTRACT

Method and apparatus for conveying containers on a conveyor in upright position is provided in which an open-ended movable receptacle is mounted adjacent to and above a conveying belt. The receptacle is adapted to stabilize a container after placement on a conveyor and to permit the continuous placement of containers on the conveyor.

19 Claims, 10 Drawing Figures

Patented Aug. 14, 1973
3,752,292
2 Sheets-Sheet 1
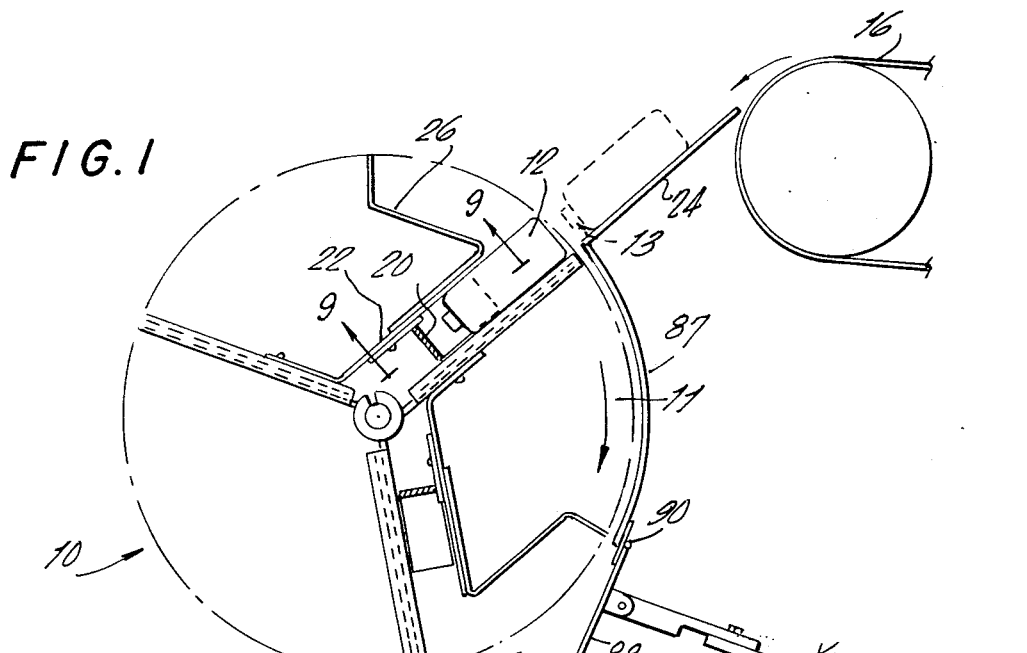
FIG.1
FIG.9
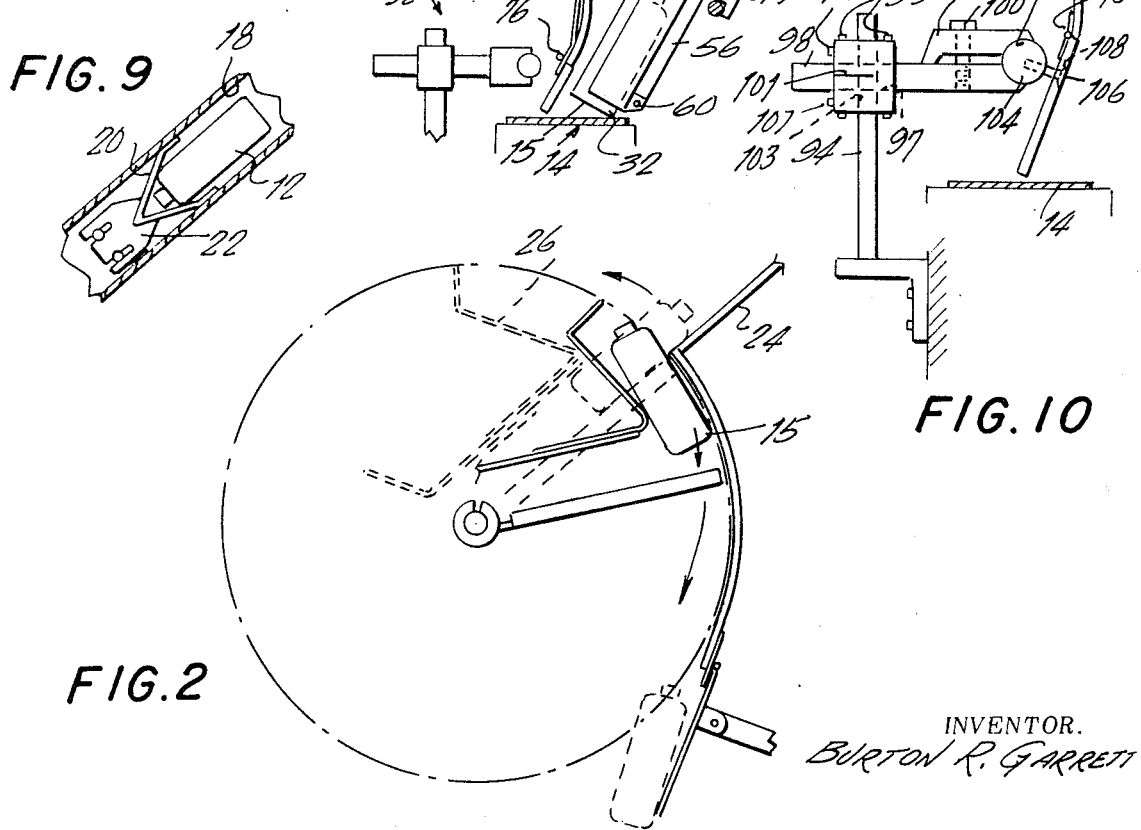
FIG.2
FIG.10
INVENTOR.
BURTON R. GARRETT
Bierman & Bierman, ATTORNEYS

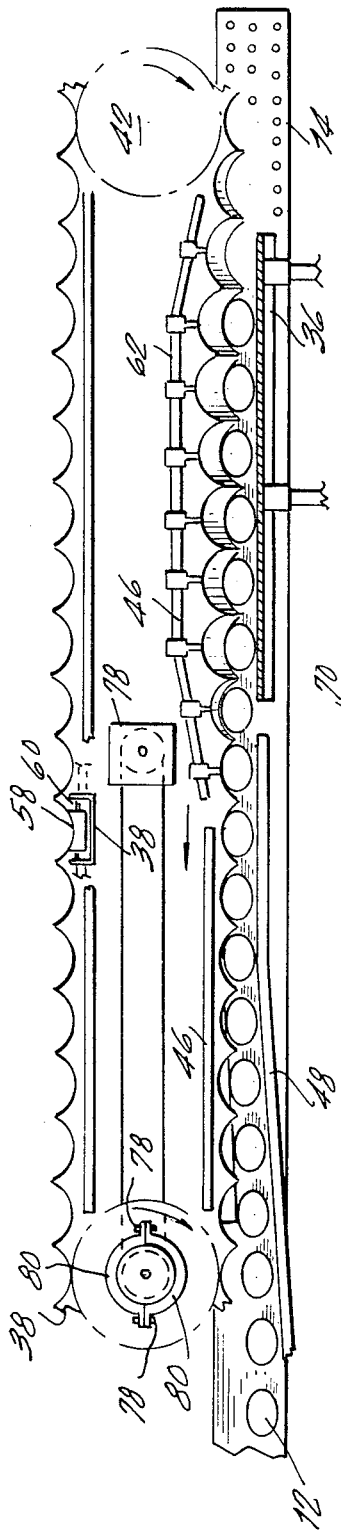

METHOD AND APPARATUS FOR CONVEYING CONTAINERS

This invention relates to container conveying means and, more particularly, to means for stabilizing and carrying bottles on a conveyor belt from one station to another.

Conveyor systems for moving containers from one station to another have long been used, albeit with certain problems. One such problem is the initial placement of a stationary container on a continuously moving conveyor. The container is subjected to rapid acceleration by the conveyor which tends to destabilize it. Often, the container will topple or move out of position registry with the other containers. This may cause jamming of equipment at the initial station or other stations where registry may be critical.

In a high speed automatic container handling system, the containers are preferably placed on the conveyor by machine, generally several at one time. Each group of containers must be rapidly moved away from the depositing apparatus to make room for the next group of containers. The initial speed at which each group of containers is moved is generally greater than the speed at which these containers are to be delivered to the next station. Obviously, this necessitates speed reduction devices for the conveyor at a point removed from the container deposition area. Of course, the use of speed reduction devices further subjects the containers to unwanted speed rate changes which may also destabilize the containers or otherwise change the position registry between containers.

In accordance with the present invention a novel system is provided which eliminates the need for using speed reduction devices. The invention further provides for stabilizing the container on the conveyor and for reducing position error so frequently inherent in prior art devices.

In its preferred form, the invention is comprised of one or more receptacles positioned above the conveyor surface and open at the top and bottom. The opening at the top is for receiving containers dropped into the receptacle, and the bottom opening permits the container to rest on the conveyor surface. For best results, the receptacles are continuously moved past a container depositing device which deposits a container in each receptacle.

Continuous receptacle movement eliminates the need for speed reduction devices in the conveyor system. Although it is highly desirable to eliminate the use of speed reduction devices, they can be used in conjunction with the system of the instant invention without the drawbacks inherent in other systems.

More specifically, the receptacles of the instant invention are adapted to receive containers and then move the containers at substantially conveyor speed until they have stabilized. After stabilization, the receptacles and containers are separated to permit the containers to continue to move on to the next subsequent station. Speed reduction devices, if desired by the user, can be incorporated into the system in the region of operability of the receptacles. It can be readily appreciated that the speed reduction devices will not affect stability of the containers during the period they are in engagement with the receptacles.

For best results, the receptacles are semi-circular. This permits the same receptacles to receive different diameter containers and thus helps make the apparatus "universl." In addition, the semi-circular nature of the receptacles tends to center the container therein, which also aids in stabilizing the container.

Referring now to the drawings in which a preferred embodiment of the invention is shown and in which like numerals refer to like parts:

FIG. 1 is a schematic side view of an unscrambling and conveying apparatus showing a bottle being placed in position on a conveyor;

FIG. 2 is a more detailed schematic view of the bottle unscrambler shown in FIG. 1;

FIG. 3 is a top plan schematic view of the conveying apparatus for stabilizing and moving bottles to the next subsequent station;

FIG. 4 is a top schematic view of a means for separating the receptacle and conveyor;

FIGS. 5 – 8 show the various states of the receptacle during movement of the bottle along the length of the conveyor shown in FIG. 3; and FIG. 9 is a detailed view of the method of adjusting the unscrambler of FIG. 1 taken along line 8—8 of FIG. 1.

FIG. 10 is a detail view of an adjustment mechanism used in connection with the apparatus shown in FIG. 1.

FIG. 1 of the drawings depicts a container unscrambler, generally indicated by the numeral 10 which is adapted to deposit containers 12 in timed sequence onto a conveyor generally indicated by the numeral 14. Unscrambler 10 comprises a drum 11 which is either roated at a selected speed in the direction shown, or successively indexed to deposit containers onto conveyor 14. This apparatus is more specifically described in my U.S. Pat. No. 3,487,908.

As shown in FIG. 1, containers are brought to drum 11 by a conventional endless belt assembly 16. The containers are fed to the drum 11 preferably one at a time as shown, and in timed sequence coinciding with the speed of rotation of the drum. The drum 11 is provided with a plurality of bores 18 adapted to receive the container 12 for subsequent deposit on conveyor 14. Depth of container penetration into the bore 18 is controlled by an adjustable V-shaped flange 20 mounted on a movable plate 22 as best seen in FIG. 8.

Generally, most conventional containers have neck portions 13 smaller than the container bottoms 15. The flange 20, being V-shaped, will permit the forward end or neck portion 13 of the container to penetrate farther into bore 18 than would be the case if the bottom 15 of the bottle were presented to the bore 18. If for any reason the containers 12 are presented to the bore 18 rear end first, the bottle will not penetrate as deeply into the V-shaped flange 20 and the neck of the bottle will protrude from the circumference of the drum as shown in FIG. 2. A reorienting shield 24 is provided adjacent to the rim of drum 11. If the container is in the bore 18 rear end first, the protruding portion of the container will contact the reorienting shield 24 upon rotation of the drum and the container will be forced into a shallow recess 26 provided in the drum surface. In this manner, containers presented to bore 18 bottom end first are reoriented for proper presentation to the conveyor, rear end first.

A receptacle 28 shown as being half-round is provided adjacent to and above the plane of the conveyor 14. The receptacle 28 is open at the top and bottoms ends 30 and 32 respectively. When the container 12 is deposited into the receptacle 28, the bottom surface 15 of the container will contact the surface of conveyor 14.

Although the receptacle 28 may be vertical for initial reception of a container 12, it is preferably inclined with respect to the vertical or plane of the conveyor 14 as shown in the drawings. When the container is released into the inclined receptacle, it will be positioned and centered therein by the force of gravity and by the half-round shape of the receptacle. It can readily be appreciated that due to the half-round shape of the receptacle, registration between the container and receptacle at the moment of entry doesn't have to be exact since the container will center automatically in the receptacle.

Inclination of the receptacle 28 is achieved by providing a support for the bottom of the receptacle 28 generally indicated by numeral 54. The support, as shown in the drawings, is mounted directly on the rear or closed portion of the receptacle 28. The support has a carrier bar 56 mounted to the receptacle by conventional means such as screws (not shown). Mounted on the bottom of the receptacle 28 is a block 58 to which the carrier bar 56 is affixed. In addition, block 58 is provided with a bushing 60 which extends on either side of block 58 for pivotally mounting the complete receptacle assembly to the sprocket chain 38 (shown in section in FIG. 1 and schematically in FIG. 3). It can be readily appreciated that receptacle 28 is free to pivot about bushing 60 to any desired degree.

To control the degree of inclination of the receptacle 28, a cam track 46 is mounted adjacent to and above the conveyor 14. The cam track 46 is adapted to ride within a cam follower 44 mounted on the receptacle 28.

Cam track 46 and cam follower 44 provide the support needed to control pivoting motion of the receptacle 28 about bushing 60. For best results, cam track 46 extends entirely around the apparatus defined by the driven rolls 40, 42 used to drive the chain and sprocket assembly 38. To provide for inclination of the receptacle 28, the cam track 46 is curved inwardly at 62 (FIG. 3). As the chain and sprocket assembly moves the receptacles 28, the receptacles will pivot about bushings 60 as shown in FIG. 3 for reception of a container 12 from drum 11.

Although shown as pivoted about its bottom portion and as following a continuous cam track, it is to be understood that the receptacle 28 may be pivoted about its upper portion and provision may be made to make the cam track 46 discontinuous. Additionally, inclination of the receptacle 28 need not be provided for if not desired.

With the receptacle and container in an inclined position, provision is made for righting the container 12. This is achieved in accordance with the present invention by providing a pair of brace bars 48 and 50 preferably coextensive with each other and with the degree of lineal movement of the containers from a point after the containers are deposited on the conveyor 14 to completion of all operative steps taken to stabilize the containers.

Referring specifically to FIGS. 3 through 8, the container 12 is received at an angle in receptacle 28 (FIG. 5). After the receptacle and container have moved somewhat and the receptacle is beginning to return to vertical, brace bar 50 contacts the lower or bottom end 15 of the container (FIG. 6) causing the container to right itself (FIG. 7). Brace bar 48 (FIGS. 6 and 7) is provided to control the pivoting motion of the container 16 and to assure that the container will not pivot through the vertical position.

As the container 12 is pivoted to vertical, the receptacle 28 slowly follows suit, completing its vertical pivoting motion shortly after the container, as shown in FIG. 8. After the sequence of vertical movement steps is completed, it can be seen that the receptacle will again encompass the container along the entire height of the container.

Although brace bar 50 is shown and described as the pivot for the container, it is to be understood that the primary function of this bar is as a support for the righted container. The container may be righted solely by the pivoting receptacle without adverse effect.

In addition, the two brace bars 48 and 50 may be combined and a single brace bar (not shown) used in their stead. Although not as desirable as the use of two such bars, the function can at least in some instances be provided by a single bar.

For best results, the conveyor 14 is moved slightly faster than the receptacle 28. This difference in speed, along with the curvature of the receptacle, will cause the containers to center in the receptacle, thereby tending to assure good alignment of the containers on the conveyor as they move to the next station.

After the container and receptacle are righted, means for separating them is provided (FIGS. 4 and 8). As seen, a cam track 70 is mounted above the surface of the conveyor 14 and adjacent the bottom 15 of the container. Cam track 70 is curved as shown at 72 to urge the containers 12 out of the receptacle 28 as the conveyor 14 moves. To retain the container in stabilized condition, brace bars 48 and 50 follow the curvature of the cam track 72. Alternatively, means may be provided for moving the receptacles outwardly to separate them from the containers such as by curving the track of the chain and sprocket assembly (not shown).

Another highly desirable feature achieved by the instant invention is correct and constant spacing between containers. By virtue of the use of receptacles 28 and the means described above for stabilizing the containers, it will be readily appreciated that the spacing between successive containers will be essentially constant, a feature not generally obtainable by prior art methods.

As shown in FIG. 3, the sprocket and chain assembly is driven through a conventional split hub assembly which is disengageable by loosening bolt and nut assemblies 78 to loosen the hub halves 80. In this way, the chain and sprocket assembly may be indexed with respect to the unscrambler 10 to correct for misalignment between the bores 18 therein and the receptacles 28. Although desirable, this feature may be omitted in favor of a differential gear box for the drum 11, (not shown), or it may advantageously be used in combination with the gear box.

As can be readily appreciated, the apparatus of the instant invention provides means for depositing bottles in perfect alignment and with complete stability on a moving conveyor belt 14 for movement to the next subsequent station. In the apparatus as shown, the next subsequent station will most generally be a filling station (not shown).

Other quite useful features are included. Of particular importance is the manner in which containers are fed to the receptacles, as best seen in FIGS. 1 and 10.

Surrounding a portion of the periphery of drum 11 is a shield 87 to which is connected a moveable guide 88. A conventional piano hinge 90 is used to connect the shield and guide. Fixedly mounted on guide 88 is a conventional extensible control device 86 (turnbuckle, etc.) for controlling the position of the guide.

As can be readily appreciated, the shield 87 retains the container within the drum until bore 18 has cleared the shield. At this point, the container will begin to slide out along guide 88 towards the receptacle. For best results, the guide is held at substantially the same angle of inclination as the receptacle so that the movement of the container into the receptacle is as smooth as possible. Of course, it is to be understood that the angle of shield 84 may be varied to change the position of initial contact of the container with the receptacle, i.e., it can be positioned to deposit the container closer to the top or bottom of the receptacle.

Positioned adjacent the open side of receptacle 28 is a second shield 84. Shield 84 is hingedly mounted by a conventional torsion spring hinge member 76 to a plate 78 which is in turn mounted to a fixed frame for reasons hereinafter described.

An additional plate 91 is fixedly mounted to plate 78. Plate 91 is a control plate and serves as the stop for a conventional screw 80 which will change the angle of shield 84 to widen the distance between shields 84 and 88, to help properly guide the container into the receptacle. Obviously if the drum is rotating faster, the containers will be moved farther to the left (FIG. 1) before it clears the drum. In addition, the faster the drum is rotated, the more difficult it will be for the containers to properly settle into the receptacles.

To avoid these problems, the combination of shield 84 and plate 78 is movable towards and away from the receptacle to provide for different container thicknesses or diameters. For best results, the distance between plate 78 and the bottom of the receptacle should be slightly greater than the maximum diameter of the container to ease entry of the container into the receptacle. FIG. 10 details this construction. As can be seen, plate 78 is mounted on a rod 104 by a conventional flat head screw 106. Plate 78 is provided with a bore 108 for this purpose. The ball 104 is surrounded by a socket 105 defined by two adjustable bars 102 and 98. Screw 100 connects these two bars together and is used to tighten or loosen the ball to permit adjustment of the angle of plate 78.

Bar 98 extends into a two way clamp 96 through slot 97 and is held in place by screws 99. The clamp 96 is longitudinally split at 101 so that tightening screws 99 will lock the bar 98 in place. Conversely, loosening screws 99 will permit longitudinal movement of the bar 98 and also plate 78.

Since the plate 78 is positioned rather close to the conveyor surface, angular changes may necessitate height changes. Therefore, clamp 96 is provided with a conventional split bore 103 (vertical dotted line) and screws 107 for tightening or loosening the clamps to permit vertical movement of the clamp.

Although a preferred embodiment of the instant invention has been described above, it is to be understood that many changes and modifications can be made which will fall within the true spirit and scope of the invention as defined in the claims.

What is claimed is:

1. Container conveying apparatus comprising a movable receptacle for receiving a container, a conveyor mounted below said receptacle, said receptacle having an open bottom whereby a container placed in said receptacle will contact said conveyor, means for depositing a container in said receptacle, means for pivotally mounting said receptacle on said apparatus and means for pivoting said receptacle to an inclined position to ready said receptacle for receipt of said container, said means for pivotally mounting said receptacle retaining at least one point on the bottom of said receptacle at a substantially constant height over said conveyor, said incline being such that the container will contact and be carried by the conveyor as well as the receptacle immediately upon receipt of said container by said receptacle.

2. The apparatus specified in claim 1 wherein said receptacle is cylindrical in shqpe and open along its length over a portion of its circumference.

3. The apparatus specified in claim 2 wherein said conveyor and receptacle are moved at different speeds to urge said container to center in said receptacle.

4. The apparatus specified in claim 2 further comprising means for separating said receptacle and said container at a preselected point to permit the stabilized containers to be carried in stable condition by said conveyor.

5. The apparatus specified in claim 1 further comprising a chain sprocket assembly located above said conveyor, and means for mounting said receptacle on said chain sprocket assembly to permit pivotal movement of said receptacle between an inclined position and a vertical position.

6. The apparatus specified in claim 1 further comprising means for urging said container to move to a vertical position.

7. The apparatus specified in claim 6 further comprising means mounted adjacent and above said conveyor for preventing movement of the container through the said vertical position.

8. The apparatus specified in claim 1 wherein said means for tilting said receptacle comprises a cam track mounted adjacent said conveyor and on one side of said receptacle, cam follower means mounted on said receptacle adapted to contact and be guided by said cam track, said cam track having a preselected curvature over at least a portion thereof, said cam follower being constrained to follow the path of said cam track and tilt the said receptacle in the region of curvature of said cam track.

9. Apparatus according to claim 1 further comprising means for placing containers having different sized ends, bottom end first on a conveyor comprising a rotatable drum having at least one bore in its circumference, said bores being adapted to receive said containers, said drum being rotatable to move said drum from a container receiving position to a container dispensing position, guide means associated with said drum and conveyor to guide the container onto said conveyor as said container is dislodged from said bore, and movable receptacle means positioned adjacent said conveyor for receiving said containers.

10. Apparatus as specified in claim 9 wherein said guide means comprises a shield adjacent the periphery of said drum.

11. Apparatus as specified in claim 10 wherein said shield is mounted on a hinge, and means for adjusting the position of said shield.

12. Apparatus as specified in claim 9 further comprising means for synchronizing the drum rotation with movement of said receptacles to deposit a continuous series of equally spaced containers on said conveyor.

13. Apparatus as specified in claim 12 wherein said shield is hingedly mounted on a plate, and means for adjusting the position of said shield with respect to said hinge.

14. Apparatus as specified in claim 13 wherein said plate is mounted on an adjustable bar means and means for adjusting the position of said plate.

15. In a container conveying apparatus for moving containers between at least two stations on a conveyor, the improvement comprising an open bottom tiltable receptacle positioned above said conveyor for receiving said containers, said receptacle being tiltable between a first position in which said receptacle is maintained on an angle with respect to a line normal to the plane of the conveyor during which said containers are received in said receptacle and on said conveyor substantially simultaneously, and a second position in which said receptacle is vertical with respect to the plane of the conveyor surface.

16. Method of conveying containers on a moving conveyor in an apparatus of the type having an open ended vertically maintained receptacle for said container positioned adjacent to said conveyor comprising the steps of placing said receptacle on an incline with respect to said conveyor surface and at an angle to insure contact of said container with said conveyor prior to returning said receptacle to its vertical position, substantially simultaneously depositing said container in said receptacle and on said conveyor, moving said receptacle in the direction of movement of said conveyor, returning said receptacle to vertical position, and maintaining said container in said receptacle for a preselected distance.

17. The method specified in claim 16 wherein said receptacle is maintained in said tilted condition until said container has become stabilized to a selected degree on said conveyor.

18. The method specified in claim 16 further comprising the step of separating said receptacle and container after a selected degree of movement of said receptacle and container has taken place.

19. The method specified in claim 16 further comprising the step of moving said receptacle and said container at different speeds to urge said container to center in said receptacle.

* * * * *